United States Patent
Potter et al.

(10) Patent No.: US 11,851,896 B2
(45) Date of Patent: Dec. 26, 2023

(54) THERMAL MANAGEMENT SYSTEM FOR A DRIVE TRAIN

(71) Applicant: Multiquip Inc., Cypress, CA (US)

(72) Inventors: Eric Potter, Caldwell, ID (US); Erick Del Real, Meridian, ID (US); Kimball Anderson, Boise, ID (US); Larry Jake Chapple, Boise, ID (US)

(73) Assignee: Multiquip, Inc., Cypress, CA (US)

( * ) Notice: Subject to any disclaimer, the term of this patent is extended or adjusted under 35 U.S.C. 154(b) by 575 days.

(21) Appl. No.: 17/106,055

(22) Filed: Nov. 27, 2020

(65) Prior Publication Data

US 2021/0180340 A1    Jun. 17, 2021

Related U.S. Application Data

(60) Provisional application No. 62/940,832, filed on Nov. 26, 2019.

(51) Int. Cl.
| | |
|---|---|
| *E04F 21/24* | (2006.01) |
| *H02P 23/14* | (2006.01) |
| *H02P 29/68* | (2016.01) |
| *F03D 7/02* | (2006.01) |
| *H02P 5/46* | (2006.01) |
| *G05B 11/42* | (2006.01) |

(52) U.S. Cl.
CPC ............ *E04F 21/245* (2013.01); *H02P 23/14* (2013.01); *H02P 29/68* (2016.02); *E04F 21/247* (2013.01); *E04F 21/248* (2013.01); *F03D 7/02* (2013.01); *G05B 11/42* (2013.01); *H02P 5/46* (2013.01)

(58) Field of Classification Search
CPC ..... E04F 21/245; E04F 21/247; E04F 21/248; H02P 23/14; H02P 29/68; H02P 5/46; F03D 7/02; G05B 11/42
See application file for complete search history.

(56) References Cited

U.S. PATENT DOCUMENTS

| | | | | |
|---|---|---|---|---|
| 3,067,555 | A * | 12/1962 | Newell | B65B 9/22 53/551 |
| 6,846,127 | B1 * | 1/2005 | Braun | E04F 21/248 404/112 |
| 7,381,009 | B2 * | 6/2008 | Jenkins | F16D 48/06 404/112 |

(Continued)

*Primary Examiner* — Ramesh B Patel
(74) *Attorney, Agent, or Firm* — Burdick Patents, P.A.; Sean D. Burdick

(57) ABSTRACT

A method for thermal management of a power trowel executable by an on-board logic controller allows operation of the trowel in normal mode in which rotor speed is determined by manual control and in which a sensed temperature of the trowel lies below a high temperature setpoint. In response to the sensed temperature exceeding the high temperature setpoint, the controller switches operation of the power trowel from normal mode to thermal management mode in which a maximum rotor speed achievable by manual control is reduced by the controller in incremental steps to allow the trowel to cool. In response to the sensed temperature reaching a low temperature setpoint, the controller increases rotor speed in incremental steps, and returns operation to normal mode when a desired rotor speed is maintained for sufficient time during which the sensed temperature remains below the low temperature setpoint.

20 Claims, 5 Drawing Sheets

(56) References Cited

U.S. PATENT DOCUMENTS

| | | | | |
|---|---|---|---|---|
| 8,708,598 | B2* | 4/2014 | Hanson | E04F 21/247 |
| | | | | 404/112 |
| 9,631,378 | B1* | 4/2017 | Grahl | E04F 21/247 |
| 10,100,537 | B1* | 10/2018 | Guinn | E04F 21/247 |
| 11,193,286 | B2* | 12/2021 | Del Real | E01C 19/42 |
| 2003/0231930 | A1* | 12/2003 | Allen | E04F 21/242 |
| | | | | 404/72 |
| 2005/0100405 | A1* | 5/2005 | Jenkins | E04F 21/248 |
| | | | | 404/112 |
| 2009/0169300 | A1* | 7/2009 | Allen | E04F 21/247 |
| | | | | 404/112 |
| 2011/0222966 | A1* | 9/2011 | Allen | E04F 21/247 |
| | | | | 404/112 |
| 2012/0163914 | A1* | 6/2012 | Grahl | E04F 21/247 |
| | | | | 404/112 |
| 2013/0315667 | A1* | 11/2013 | Hanson | E04F 21/247 |
| | | | | 404/112 |
| 2018/0355624 | A1* | 12/2018 | Del Real | E04F 21/247 |
| 2020/0263443 | A1* | 8/2020 | Del Real | E04F 21/247 |
| 2020/0360880 | A1* | 11/2020 | Sleightholme | B29C 67/242 |
| 2021/0143709 | A1* | 5/2021 | Sprague | H02P 6/28 |
| 2021/0180340 | A1* | 6/2021 | Potter | E04F 21/245 |
| 2022/0090397 | A1* | 3/2022 | Del Real | E01C 19/42 |

* cited by examiner

THERMAL MANAGEMENT SYSTEM FOR A DRIVE TRAIN

RELATED APPLICATIONS

This application claims priority to U.S. Provisional Application 62/940,832 that was filed on Nov. 26, 2019 and which is fully incorporated herein by reference.

BACKGROUND OF THE INVENTION

Field of the Invention

The present invention relates generally to temperature control systems for drive trains, and more specifically to a method and system for operating a power trowel to prevent overheating of power trowel drive train components.

Description of Related Art

Sustained operation of power trowels under heavy load can lead to overheating of engine coolant, hydraulic fluid, or other drive train components of the power trowel system. Such overheating can shorten the service life of the trowel, damage trowel components, or lead to trowel failure. Existing solutions are known to de-rate the output power (e.g. by 40%) in response to sensing high temperature, which can render the trowel unsuitable for continued usage in certain applications. In other cases an overtemperature condition can cause shut down the engine. In either case, the trowel may need to be removed from a partially finished concrete pour until it cools sufficiently or until a replacement trowel can be deployed.

What is needed is a control scheme for a power trowel that prevents drive train components from overheating while allowing continued operation of the trowel.

SUMMARY OF THE INVENTION

The foregoing problems are overcome by a method and system according to the present invention for thermal management of a power trowel that prevents trowel components from overheating while allowing an operator limited ability to operate the trowel.

In a basic embodiment of the invention, a method for controlling rotor speed in a power trowel includes a series of steps performed, for example, by a programmable logic controller configured to read data from temperature sensors and in response, run thermal management control algorithms to generate speed commands for issuance to a speed controller that governs rotor speed. In such an embodiment, salient steps of the invention executed by the controller include sensing temperature of a component of the power trowel, comparing the sensed temperature to a predetermined threshold, and adjusting in response to the sensed temperature exceeding the predetermined threshold, a maximum rotor speed achievable by manual control. The method may include a provision for incrementally stepping down the maximum rotor speed achievable by manual control in more than one incremental step, in response to periodic reading of high temperature measurements. The method may also include a provision for incrementally stepping up the maximum rotor speed achievable by manual control in more than one incremental step, in response to subsequent periodic reading of low temperature measurement.

In another embodiment, a method for thermal management of a power trowel includes the steps executed by a programmable logic controller to change the operating mode of the trowel from normal mode to thermal management mode. In a first step, the controller allows operation of the power trowel in a normal mode in which rotor speed is determined in response to manual control and in which a sensed temperature of a component of the power trowel lies below a predetermined high temperature setpoint. In a second step, the controller, in response to the sensed temperature exceeding the predetermined high temperature setpoint, switches operation of the power trowel from the normal mode to a thermal management mode in which a maximum rotor speed achievable by manual control is automatically stepped down by the controller in one or more incremental steps. In an additional step, during operation in the thermal management mode, the controller, in response to the sensed temperature dropping below a predetermined low temperature setpoint, may step up the rotor speed in one or more incremental steps. In another additional step, the controller may switch operation back to the normal mode in response to the rotor speed achieving a predetermined safe rotor speed for a predetermined time period during which the sensed temperature remains below the predetermined low temperature setpoint, where safe rotor speed is rotor speed most recently recorded during a normal mode of operation.

In an more elaborate embodiment of the invention, a method of operating a power trowel incorporates both low-level adjustments and high-level adjustments to the limitation on maximum rotor speed achievable by manual control, depending on how hot a power trowel component is running. In an exemplary method, a controller periodically reads a value representing temperature of a component of the power trowel. The controller then compares the value each time it is read to a predetermined lower limit and to a predetermined higher limit. The controller then sends a low-level decrease speed command to reduce rotor speed by a first incremental amount only whenever the value meets or exceeds the lower limit and is less than the higher limit. Alternatively, the controller sends a high-level decrease speed command to reduce rotor speed by a second incremental amount that is greater than the first incremental amount only whenever the value meets or exceeds the higher limit. The controller calculates a cumulative sum of all first incremental amounts and second incremental amounts sent by the controller, and reduces maximum rotor speed achievable by manual control according to the sum. In one embodiment, the controller limits the cumulative sum to a predetermined bound. In another embodiment, the controller sends the high-level decrease speed command at a higher frequency than a frequency at which the controller sends the low-level decrease speed command. In another embodiment, the controller sends an increase speed command to increase rotor speed by a third incremental amount only whenever the value is less than the lower limit and the cumulative sum is greater than zero. In the latter case, when calculating the sum, the controller subtracts all third incremental amounts from the cumulative sum.

In another variation of the invention, in a method of operating a power trowel, the controller monitors multiple (N) temperature sensors installed at various locations on the trowel where trowel components are vulnerable to overheating as a result of heavy loading conditions such as high speed or prolonged operation. In this method the controller periodically reads N values each representing a temperature of a different one of N components of the power trowel, and for each of the N values, the controller updates each of a corresponding N adjusted speed commands by: (1) comparing the Nth value each time it is read to a predetermined lower limit, (2) incrementing the Nth adjusted speed command by a first incremental amount whenever the Nth value meets or exceeds the lower limit, and (3) storing the Nth adjusted speed command as incremented. The controller then periodically selects from among all N adjusted speed commands the Nth adjusted speed command that represents a greatest reduction in rotor speed, and reduces maximum rotor speed achievable by manual control according to the selected Nth adjusted speed command. Examples of power trowel components monitored for temperature include engine coolant, hydraulic fluid, and motor casing. In this method, the predetermined lower limit may vary according to the power trowel component being measured for temperature. The controller may also compare the Nth value each time it is read to a predetermined higher limit, and increment the Nth adjusted speed command by a either a first incremental amount whenever the Nth value is less than the higher limit and meets or exceeds the lower limit, or by a second incremental amount whenever the Nth value meets or exceeds the higher limit. The controller may also increment the Nth adjusted speed command by a either a first incremental amount whenever the Nth value meets or exceeds the lower limit, or decrement the Nth adjusted speed command by a decremental amount whenever the Nth value is less than the lower limit.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

Figure 1:
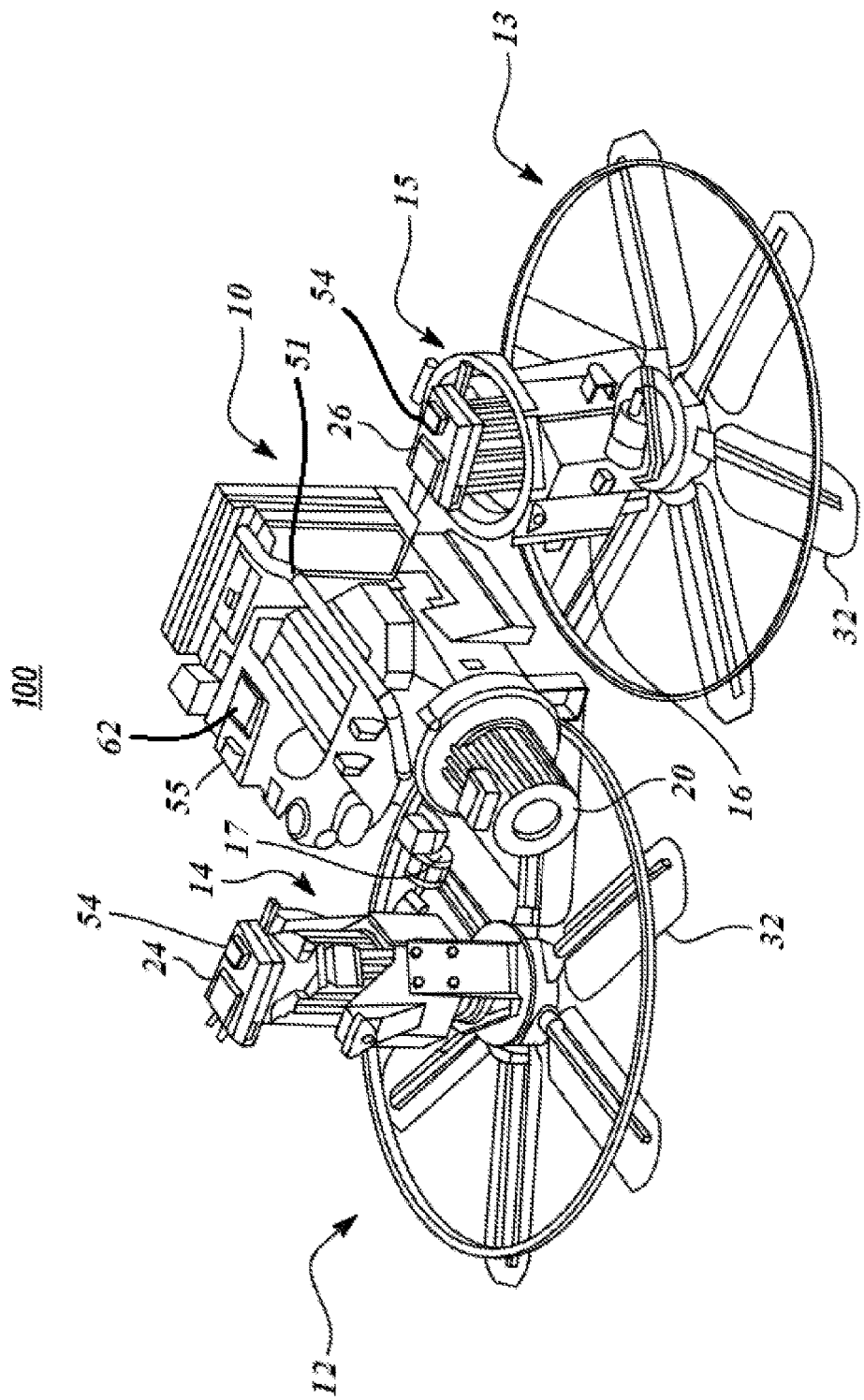
FIG. 1 is a perspective view of main drive train components of a typical power trowel for which a control system according to the invention may be applied for thermal management of the power trowel.

According to the present invention, a method for thermal management of a machine drive train, such as a drive train of a power trowel, is provided to prevent components of the machine from overheating during operation. One or more components of the machine are monitored for temperature, and if one or more of the components begins to overheat, a control system for the machine enters a thermal management mode of operation. In thermal management mode, a controller adjusts or limits performance of machine systems to counteract overheating, e.g. by reducing load or by energizing a cooling system. In an illustrative case, in which the machine is a power trowel, thermal management mode partially overrides manual control so that maximum speed of trowel rotors achievable by manual control (hereafter "maximum manual speed") is stepped down gradually by automated action of the control system. In thermal management mode, the gradual step-down of maximum manual speed is made to be imperceptible to the operator, by reducing maximum manual speed by a small increment, e.g. by 2 rpm, 4 rpm, 10 rpm, etc., with each step-down. While in thermal management mode, the power trowel may be subject to further incremental reductions in maximum manual speed for as long as a high temperature condition is detected in any machine component. Further, while in thermal management mode, in response to sensing for a sufficient period of time safe operating temperature for all components of the power trowel that are being monitored for temperature, the control system may gradually step up the maximum manual speed in similar small increments, and eventually return the power trowel to a normal mode of operation. Generally, a control scheme according to the invention modifies machine operation in response to sensing a high temperature condition, to allow machine components to cool to a safe operating temperature while otherwise maintaining system operations.

Drive trains for both walk-behind and ride-on power trowels are well known in the art. An example of a state-of-the-art drive train for a ride-on trowel is disclosed in U.S. Pat. No. 10,584,499 assigned to Multiquip Inc., which is fully incorporated herein by reference. To further assist the reader in understanding the present disclosure, certain terms used throughout the present disclosure are defined as follows:

Adjusted Speed Command (ASC): an updated speed command that is set in response to sensing operating temperatures of machine components. An ASC value represents a desired reduction in the maximum rotor speed achievable by manual control.

Decrease Speed Command (DSC): a command to decrease machine load (e.g. speed) that is sent periodically while a machine component is running too hot.

High Temperature Setpoint (HTS): a predetermined temperature of a machine component at and above which the thermal management control system reacts to decrease machine load at a rate faster than its rate of reaction when the machine component temperature is below the predetermined high temperature.

Increase Speed Command (ISC): a command to increase machine load (e.g. speed) that is sent periodically after the machine component has cooled to a normal operating temperature while actual speed is not yet restored to operator requested speed (OS).

Lower Bound: lowest value of ASC to which the thermal management control system is allowed to limit a particular machine operation, such as rotor speed.

Low Temperature Setpoint (LTS): a predetermined temperature of a machine component which is the lowest temperature at which the thermal management control system reacts to decrease machine load, and below which lies a safe operating temperature of the machine component.

Normal: a mode of operation of a machine control system in which thermal management mode is off.

Speed Command (SC): the desired load (e.g. speed) that an operator has requested, for example, by manual throttle control.

Thermal Management: a mode of operation of a machine control system that adjusts or limits performance of machine systems in response to sensing high temperature conditions in one or more machine components.

Figure 2:
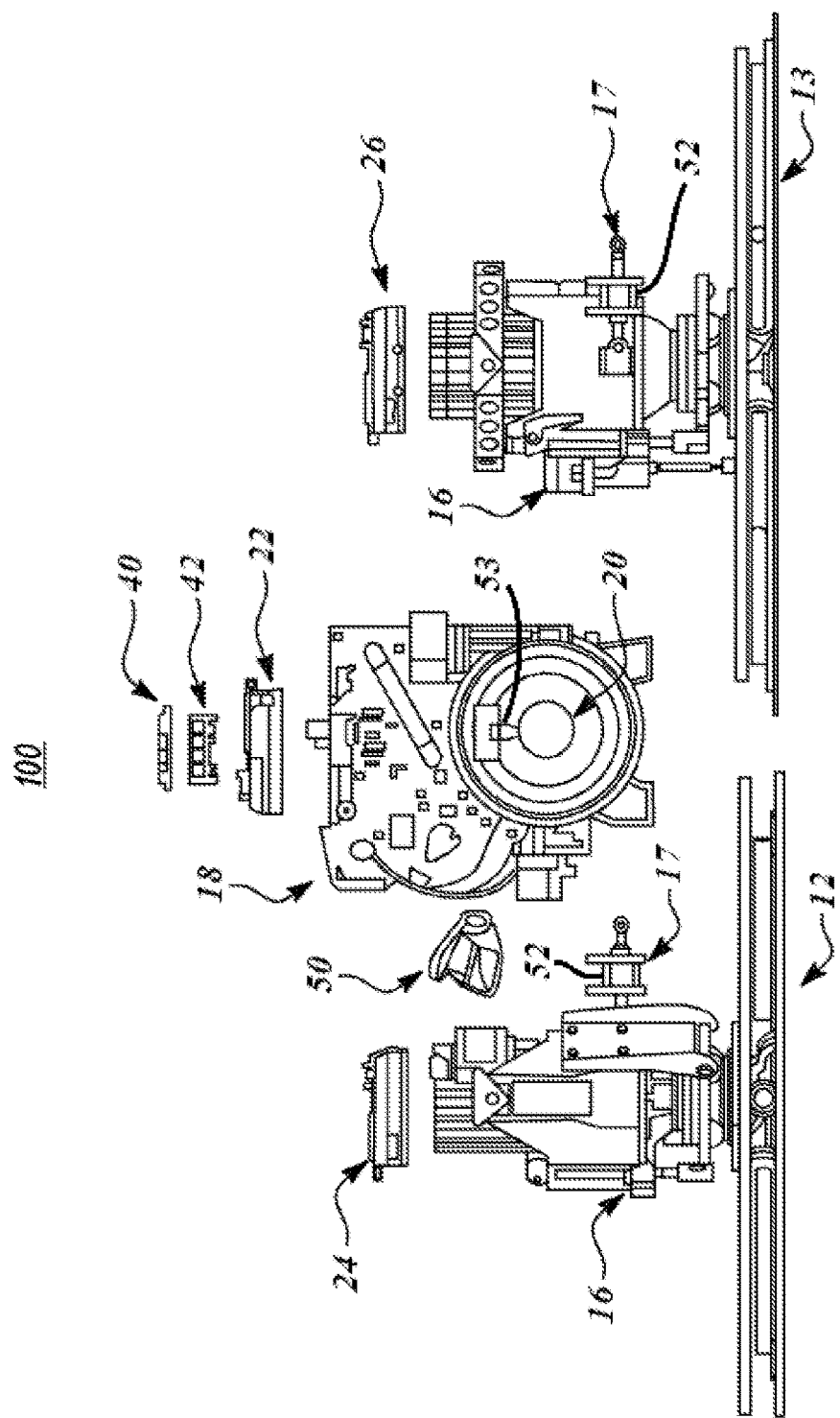
FIG. 2 is an exploded frontal view of the main drive train components shown in FIG. 1.

FIGS. 1 and 2 illustrate main components of a typical power trowel system for which a control system according to the invention for thermal management of a power trowel may be applied. While these figures depict an electrically driven power trowel, the concepts and methods of the present invention are equally applicable to hydrostatically driven power trowels.

FIG. 1 shows a perspective view of one embodiment of a drive train 100 for an electrically driven power trowel. The drive train 100 is mounted to a rigid frame depicted, for example, in U.S. Pat. No. 8,998,531, which is fully incorporated herein by reference. For simplicity and ease of illustration, the rigid frame and other ancillary components of the power trowel are omitted from the figures herein. The main components of the power trowel drive train 100 include an electrical power source 10, a pair of rotatable rotor assemblies 12, 13, electric motors 14, 15 operatively connected between the electrical power source 10 and the rotatable rotor assemblies 12, 13, respectively, a set of hydraulic actuators 17 configured for tilting the rotor assemblies 12, 13, and a set of hydraulic pitch actuators 16. Here, although drive train 100 is shown having a pair of rotor assembles 12, 13 as would be typically provided on a riding trowel, the principles of operation described herein are equally applicable to a walk-behind power trowel that is equipped with a single rotor assembly.

The electrical power source 10 is attached to the rigid frame and provides electric power to the power trowel drive train for driving the electric motors 14, 15. The electric power may be AC or DC and may be generated and converted in various ways. For example, in one embodiment, as shown, power source 10 is configured to output DC power. The DC power is obtained from power source 10 by an internal combustion engine mechanically coupled to drive an AC generator 20, the output of which is coupled to a DC rectifier. The output of the DC rectifier is input to inverters 24, 26 that drive AC motors 14, 15 of the rotor assemblies 12, 13. In another embodiment, power source 10 comprises an engine-generator set configured to convert the engine's mechanical output into AC or DC power. The AC or DC power, in turn, drives the electric motors 14, 15. In another embodiment, the DC power may be obtained solely from a battery, or from the combination of a battery and battery charger that make up the power source 10. Battery power output may drive DC motors directly, or may be converted to AC by inverters 24, 26 for driving AC motors 14, 15.

The rotor assemblies 12, 13 each comprise a set of rotatable trowel blades 32, that are tiltably connected to the rigid frame of the power trowel. The rotatable trowel blades 32 are disposed at the bottom of the power trowel and are configured for making frictional contact with a concrete surface. Pitch actuators 16, one per rotor assembly, are configured to rotate the trowel blades 32 about a center axis of the trowel arms to adjust the pitch angle of each blade 32. The rotor assemblies 12, 13 are thus configured to support the rigid frame above the concrete surface. The rotor assemblies 12, 13 are each coupled, respectively, through a gearbox to the shaft of the corresponding AC motor 14 or 15. These motors are each operatively connected to the electrical power source 10, so that energization thereby of the motors 14 and 15 causes rotation of the trowel blades 32 across the concrete surface. In other embodiments of riding trowels, hydraulic actuators, rather than electric motors, can be used to set the direction of rotation of each rotor.

The drive train 100 includes at least three means for tilting the rotor assemblies 12, 13 with respect to the rigid frame, to cause movement of the power trowel across the surface of the concrete floor. The tilting action of each of the tilting means is best described relative to the front and rear ends of the power trowel and to a center line running centrally through the power trowel from the front end to the rear end. For purposes of illustration, the front and rear ends and the centerline can be defined by the location of the electrical generator 20. FIGS. 1 and 2 show the electrical generator 20 mounted at the front end of the power trowel. The end opposite the mounting location of the electrical generator 20 is the rear end of the power trowel, and the centerline is an imaginary line that runs from the rear end to the front end along the central axis of the electrical generator 20.

In one embodiment, one of the means for tilting a rotor assembly 12 or 13 may be a steering actuator 17 that is operably interconnected between the rigid frame and a rotor assembly 12 or 13. This configuration allows each rotor assembly 12 or 13 to be tilted fore and aft, about an axis that is substantially perpendicular to the centerline of the rigid frame. This action, combined with frictional rotation of the trowel blades 32, causes the power trowel to move from side to side along the concrete surface. The second and third means for tilting a rotor assembly 12 or 13 may be a steering actuator 17 operatively interconnected between the rigid frame and each rotor assemblies 12, 13 for selectively and independently tilting the rotor assemblies toward and away from the centerline of the rigid frame, about an axis that is substantially parallel to the centerline. The steering actuators 17 may be hydraulic, pneumatic, or electric actuators. The tilting action caused by these actuators, combined with the frictional rotation of the trowel blades 32, causes the power trowel to move forward or backward along the concrete surface. The rotational speed of the trowel blades, and the amount of friction between the trowel blades and the concrete surface puts a load on the rotor assemblies 12, 13, on the steering actuators 17, and on many other components of the drive train 100. As the load increases, the operating temperatures of the power trowel components tend to rise.

To ensure that no component overheats due to loading conditions or prolonged operation of the power trowel, a control system for thermal management according to the invention monitors the temperature of one or many of these components so that corrective action can be taken when needed. For this purpose, various temperature sensors are placed throughout the power trowel system as illustrated in FIGS. 1 and 2. The temperature sensors may be any such sensors well known in the art, e.g. thermocouples, resistance temperature detectors, thermistors, and semiconductor based sensors such as those typically included on integrated circuits. The temperature sensors may be provided to monitor engine coolant temperature at 51, hydraulic fluid temperature at 52, motor case temperature at 53, motor controller temperature sensor at 54, and/or system controller temperature at 55. Additional temperature sensors may be provided to monitor the temperature of other components not shown in the figures, such as motor winding temperature, the temperature of the graphical user interface controller, and/or the temperature of any other mechanical or electrical component of the power trowel 100. In particular, any component that can be monitored for a high temperature condition that can be remedied by reducing rotor speed, or by adjusting operation of a cooling system, is a component that may be advantageously monitored according to the present invention with a temperature sensor of one kind or another.

Figure 3:
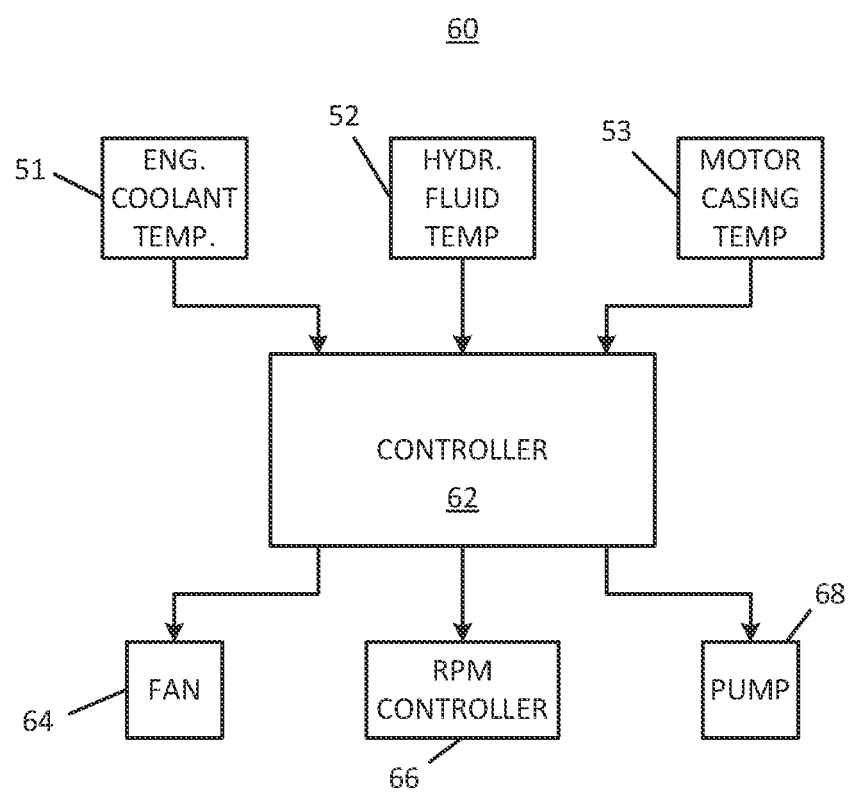
FIG. 3 is a block diagram according to one embodiment of the invention for thermal management of a power trowel.

FIG. 3 shows a block diagram according to one embodiment of the invention to illustrate basic elements of a thermal management control system 60 for a machine such as a power trowel 100. A controller 62 is the centerpiece of the control system 60. Controller 62 may be a programmable logic controller, well known in the engineering arts, such as a Parker IQAN-MC43 master controller, or similar microprocessor-based controller. Controller 62 comprises firmware, having programmable memory, and multiple I/O ports that enable it to communicate using common signal levels and protocols, such as 0-5V, 0-10V, 4-20 mA, PWM, CAN bus, etc. Controller 62 is configured to receive temperature signals from multiple temperature sensors such as 51, 52, and 53 and issue operating commands to multiple machine components such as fan 64, rpm controller 66, and pump 68. Controller 62 may also receive temperature signals via CAN bus input, for example, from another controller provided by an engine manufacturer. Controller 62 is configured to store thermal management mode control algorithms as digital logic in memory, and execute those algorithms, as disclosed herein, to perform methods according to the present invention. Physically, the controller 62 may be mounted at any convenient location on the power trowel 100, and electrically connected to sensors, machine components, and power using well known techniques.

Figure 4:
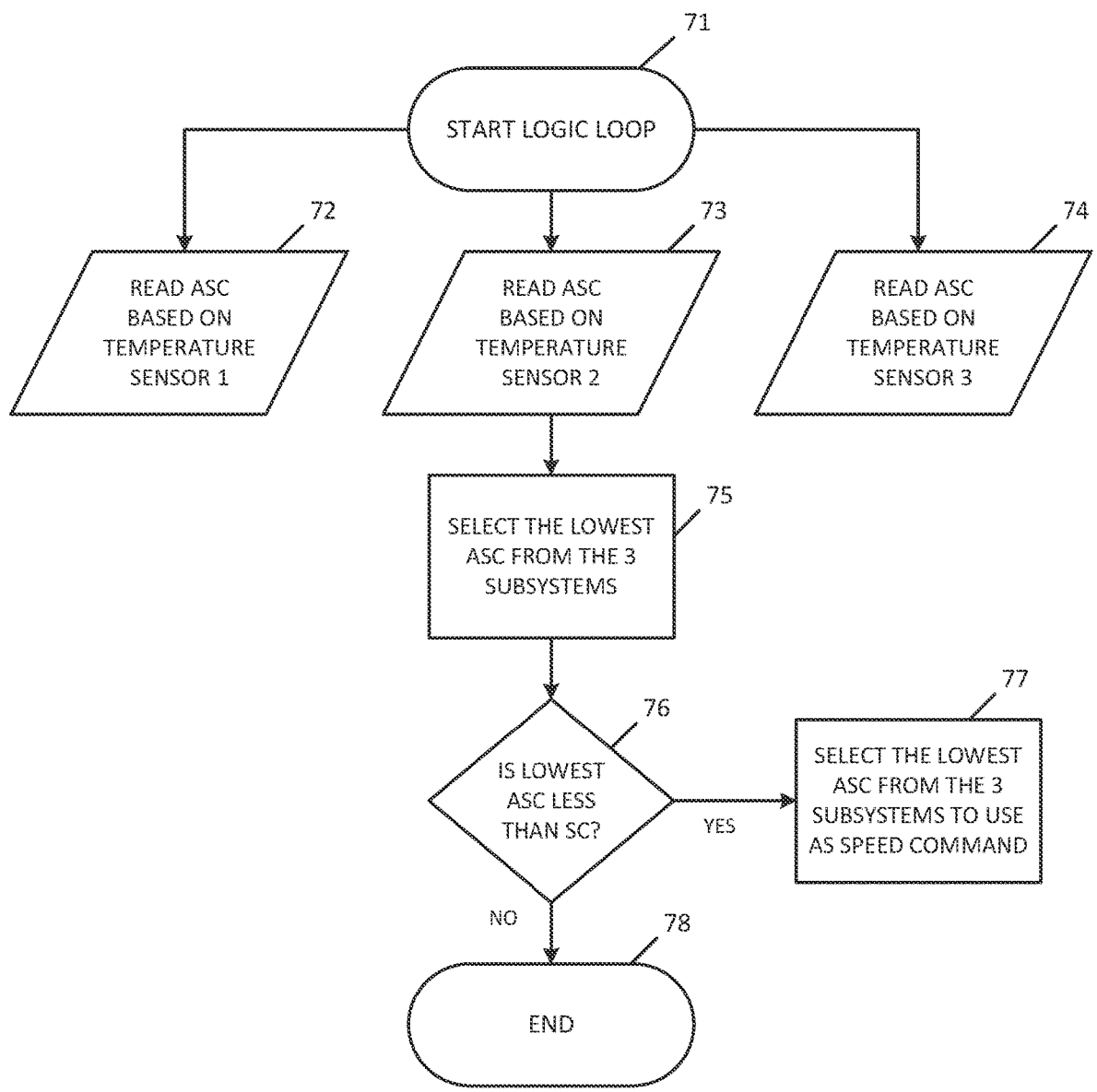
FIG. 4 is a process flow chart illustrating high level control logic for an embodiment of a system according to the invention for thermal management of a power trowel.

FIG. 4 is a process flow chart illustrating high level control logic for an embodiment of a method 70 according to the invention for thermal management of a machine. For purposes of illustration only, method 70 will be described in a case where the machine is a power trowel. Method 70 is initiated at the Start Logic Loop block 71, which represents an event such as initial energization of the power trowel by an operator. Once the trowel is started, the controller 62 may run the algorithm modeled as method 70 and begin the process of monitoring temperature data associated with various machine components. Temperature-related data is then collected and processed as represented in the data collection blocks 72, 73, 74. These three data collection and processing steps are performed in parallel. At each block 72, 73, 74, an Adjusted Speed Command (ASC) is read by the controller 62. An ASC is an updated speed command that is set in response to sensing operating temperatures of machine components. Each ASC is a function of sensed temperature, and corresponds to an incremental adjustment to be made to decrease or increase the rotor speed of the trowel. An ASC value represents a desired reduction in the maximum rotor speed achievable by manual control.

At the next process block 75, the controller selects the lowest ASC from among the three ASCs read in blocks 72, 73, 74. Here, the lowest ASC is the ASC that represents the largest desired decrease in rotor speed. Next, in the decision block 76, the controller compares the lowest ASC to the desired Speed Command (SC) set by the trowel operator. If the lowest ASC is less than SC, then the process proceeds to block 77, where the controller overrides manual speed control and sets a speed command equal to the lowest ASC. Controller 62 transmits the speed command to the rpm controller 66. If, however, at block 76 the lowest ASC is not less than SC, no override of manual speed control occurs, and the process ends at block 78. Controller 62 may then repeat method 70 at a desired frequency during continued operation of the power trowel.

Figure 5:
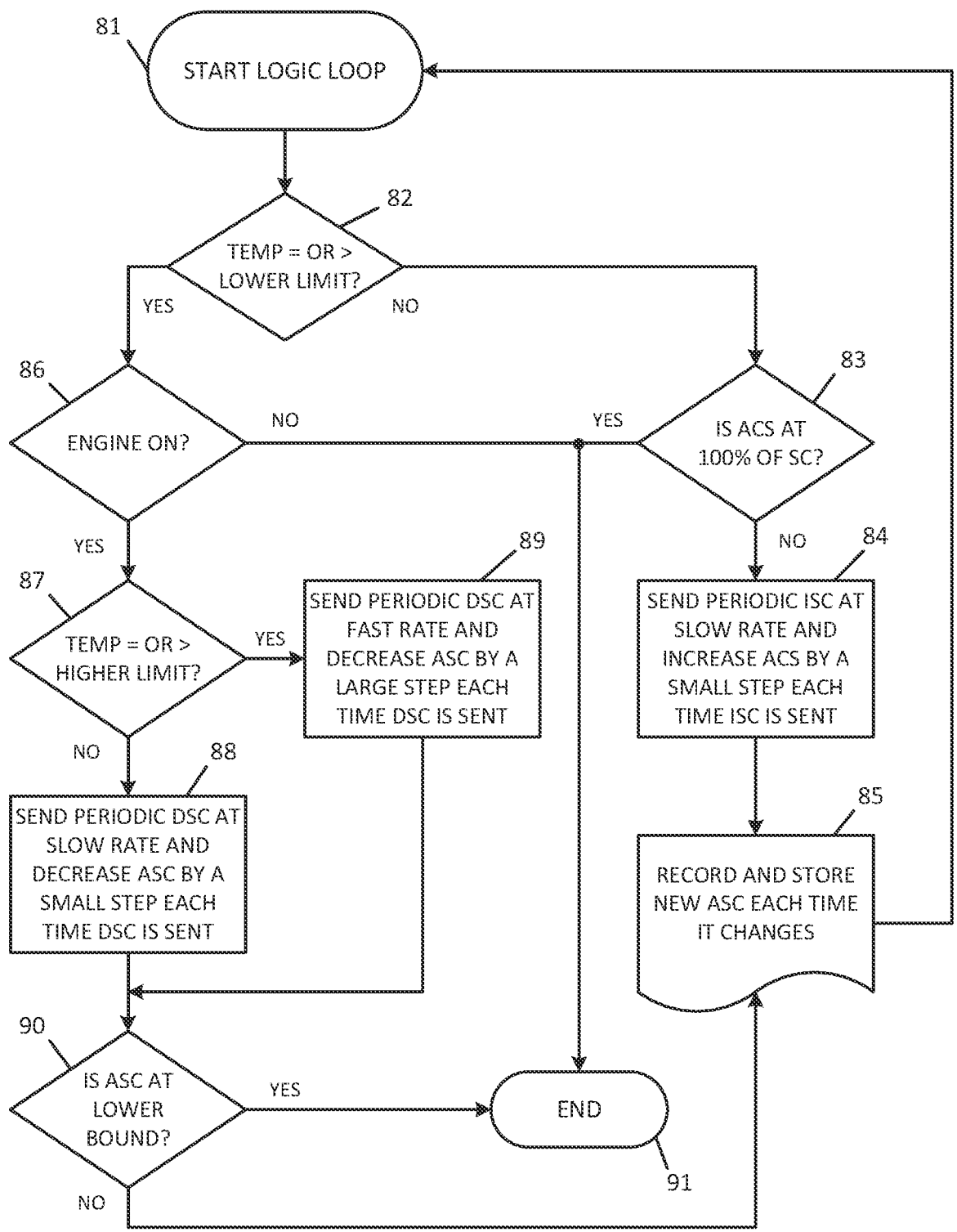
FIG. 5 is a process flow chart that illustrates a method for adjusting rotor speed in a thermal management control system according to one embodiment of the invention.

FIG. 5 shows a process flow chart that illustrates a method 80 for thermal management according to one embodiment of the invention. Method 80 may be used to determine a current value for ASC. Method 80 is performed for each temperature sensor that provides an input to the controller 62 for purposes of thermal management. Method 80 provides an exemplary algorithm that may be performed in the background for purposes of calculating and continuously updating values for ASC that are read during execution of the data collection and processing blocks 72, 73, 74 of method 70.

Method 80 is initiated at the Start Logic Loop block 81. At step 81, a value for ASC is readable by the controller from memory. In one example, at step 81 ASC may have an initial value of zero, or of some other value that corresponds to no adjustment to the maximum rotor speed achievable by manual control. In subsequent iterations ASC may have a non-zero value at step 81. From step 81 the process advances directly to decision step 82, in which the controller compares a temperature measured, e.g., at 51, 52, 53, to a Low Temperature Setpoint (LTS). The LTS may vary according to which machine component is being measured, and according to the type and placement of the sensor used to measure temperature for that component. LTS are predetermined values, stored in memory accessible by the controller 62, and may be determined empirically. In any case, the LTS is the lowest temperature at which the thermal management control system will begin to actively adjust an operating condition of the machine for purposes of controlling temperature. If the measured temperature is less than the LTS, the process advances to step 83. At step 83, the controller compares the current ASC value to the SC value to determine whether the ASC value is at 100% of the SC value, that is, whether rotor speed desired by the operator is being limited by thermal management. If the ASC value is at 100% of the SC value, then no adjustment is being made to the maximum rotor speed achievable by manual control, and the process ends at step 91 and the control system is placed in a normal mode of operation.

If however, in step 83 the ASC value is less than the SC value, then the process advances to step 84. At step 84, because the measured temperature is less than the LTS, it is safe to begin removing the speed restriction imposed by the thermal management system. Accordingly, at step 84 the controller 62 sends a periodic Increase Speed Command (ISC) to the rpm controller 66, at a relatively slow rate, and causes an increase in the ASC in small incremental steps each time the ISC is sent. For example, small incremental steps for increasing the rotor speed of a power trowel should cause gradual increase of speed that is generally imperceptible to the operator, such as 2 rpm, 4 rpm, or 10 rpm steps. Next, at step 85, the controller 62 updates the value of ASC for each incremental change and records the value in memory as the current ASC value. After recording the current ASC value, the process loops back to step 81 to continue operation in thermal management mode. The current ASC value is the value read by the controller in step 72, 73, or 74 of method 70.

Returning to step 82, if the measured temperature is greater than or equal to the LTS, the process advances to step 86. At step 86 the controller 62 checks whether the engine is on. This is a precaution to ensure that an elevated temperature reading is caused by machine loading, and not merely a transient temperature spike caused by abrupt shut-down of a cooling system. If the engine is indeed off, the process ends at step 91. If the engine is on, then the process advances to the decision step 87, in which the controller 62 compares the measured temperature to a High Temperature Setpoint (HTS). The HTS may vary according to which machine component is being measured, and according to the type and placement of the sensor used to measure temperature for that component. HTS are predetermined values, stored in memory accessible by the controller 62, and may be determined empirically. In any case, the HTS is higher than the LTS, and represents a relatively high temperature at which the thermal management control system must react more aggressively to prevent machine temperatures from reaching unsafe levels.

If the measured temperature is less than the HTS, the process advances to step 88. At step 88, the controller 62 sends a periodic Decrease Speed Command (DSC) to the rpm controller 66, at a relatively slow rate, and causes a decrease in the ASC in small incremental steps each time the DSC is sent. Small incremental steps for decreasing the rotor speed of a power trowel should cause gradual decrease of speed that is generally imperceptible to the operator, such as 2 rpm, 4 rpm, or 10 rpm steps. If, however, the measured temperature is greater than or equal to the HTS, then the process advances to step 89. At step 89, the controller 62 acts more aggressively to decrease machine load by sending a periodic Decrease Speed Command (DSC) to the rpm controller 66, at a relatively fast rate, and causes a decrease in the ASC in large incremental steps each time the DSC is sent. Large incremental steps for decreasing the rotor speed of a power trowel may be steps of 10 rpm or greater. After step 88 or 89 is executed, the process advances to step 90, where the controller 62 checks whether the ASC has reached a Lower Bound. The Lower Bound is a predetermined lowest value for ASC to which the thermal management control system is allowed to limit a particular machine operation such as rotor speed. If the ASC has reached the Lower Bound, the process ends at step 91 with the ASC maintained at the Lower Bound. If the ASC has not reached the Lower Bound, the process advances to step 85, where the controller 62 updates the value of ASC for each decremental change and records the value in memory as the current ASC value. After recording the current ASC value, the process loops back to step 81 to continue operation in thermal management mode.

In process blocks 83, 88 and 89, the rate at which an ISC or DSC is sent by the controller 62 may vary according to control system design. In one example, a slow rate of transmission may be every second, every 30 seconds, every 60 seconds, or even lower frequencies. In another example, a high rate of transmission may be every 10 seconds, every second, every 100 milliseconds, or even higher frequencies. In another embodiment, the value of incremental adjustment of ASC with each occurrence of ISC or DSC may be fixed at a common value such as 4 rpm, while frequency of transmission varies. In another embodiment, the frequency of adjustment may be common for both ISC and DSC, and the incremental adjustment of ASC value may change. For example, in block 88 a DSC of 4 rpm may be sent every second, whereas in block 89 a DSC of 20 rpm may be sent every second.

With reference again to FIG. 4, another embodiment of the invention is possible in which the decision by controller 62 whether to enter thermal management mode is not based on comparison of ASC values calculated in steps 72, 73, 74. Instead, the controller reads all temperature values being sensed in the control system and compares each one to one or more temperature setpoints stored in memory to determine if any one of the sensed temperatures exceeds a setpoint. If at least one of the temperature setpoints is exceeded, the controller 62 enters into thermal management mode and begins the process of updating the ASC by sending sequential DSC signals at a selected frequency to the rpm controller 66 while continuing to monitor component temperatures. In this fashion, the ASC is stepped down until component temperatures all fall below the Low Temperature Setpoints or until the Lower Bound is reached. If the temperatures all fall below the Low Temperature Setpoints for a predetermined safe operating period, e.g. 10, 20 or 30 minutes, the method begins the process of updating the ASC by sending sequential ISC signals at a selected frequency to the rpm controller 66 while continuing to monitor component temperatures. This way, the ASC is stepped up until the ASC reaches 100% of SC and returns the machine to normal operating mode, or until another temperature setpoint is exceeded.

Many variations on the fundamental principles of a thermal management control system according to the invention are possible. Fundamentally, the set point for maximum rotor rpm is variable, and is a function of one or more temperatures sensed in different components of the power trowel system, such as an engine coolant temperature, a hydraulic fluid temperature, an engine manifold temperature, a power supply temperature, or a temperature of an electronic component which may be temperature of the controller itself. Generally speaking, power trowel components monitored for temperature should be selected from among those components whose temperature may be affected by load on the drive train. As sensed temperature rises from a cold start, it crosses certain thresholds that each cause a reduction in power delivered to the trowel rotors. The reduction in rotor speed allows the trowel to continue operating as it cools down. The reduction in rotor speed may be effected by methods known in the art, such as by an electronic speed controller, reduction or motor current, or by hydraulic swashplate adjustment.

In another embodiment, a power trowel configured for operation using a thermal management scheme according to the invention begins operation (e.g. from cold start) in a normal mode of operation. In one example, a normal mode of operation is an operating condition in which the speed of the trowel rotors is determined according to manual throttling and in which the temperature of the power trowel system as monitored by the thermal management system (e.g. engine coolant) lies below a predetermined high temperature set point. Once normal operation is achieved, a thermal management controller periodically samples the temperature (e.g., every 30, 60, or 90 seconds), and if the high temperature set point has been exceeded since a prior measurement was taken, then the thermal management controller causes the power trowel system to enter into a thermal management mode of operation in which rotor speed may be automatically stepped down by the thermal management controller by a predetermined amount, and in which the thermal management controller overrides manual throttling to prevent manual throttling from driving the rotors above the stepped down speed. In the thermal management mode, incremental steps down in rpm may continue until the temperature drops below a predetermined low temperature set point. In one embodiment, the low temperature set point is identical to the high temperature set point. In another embodiment, the low temperature set point is lower than the high temperature set point. If, on the other hand, a sampling of temperature while in the thermal management mode indicates that temperature has dropped below a predetermined threshold (e.g. the high temperature set point, the low temperature set point, or another temperature set point), and has remained below that threshold for a predetermined period of time (e.g. 1, 5, or 10 minutes), the thermal management controller may cause rotor speed to automatically step up by a predetermined amount of rpm. Incremental steps up in rotor rpm may continue until a predetermined safe rotor speed is achieved while sensed temperature remains below the predetermined threshold, at which point the thermal management controller causes the power trowel system to re-enter into the normal operating mode and yield rotor speed control to the manual throttle. In one embodiment, the safe rotor speed is the speed of the rotors most recently recorded by the controller during a normal mode of operation. In another embodiment, the safe rotor speed is preselected at known safe operating speed, such as 150 rpm or 225 rpm.

In another embodiment, the thermal management controller samples one or more temperatures in the power trowel system at a first frequency while the power trowel is in the normal mode of operation, and samples the one or more temperatures at a second frequency (different from the first frequency) when the power trowel operation enters into thermal management mode. For example, the first frequency may be once per minute, and the second frequency may be twice per minute. Other differences in the first and second frequency are possible within the scope of the invention, including embodiments wherein the second frequency is lower than the first frequency, and wherein the first and second frequency are equal.

The operating principles and methods of the present invention may be embodied as instructions coded in software, e.g. as a computer program stored in non-volatile memory and executable by a microprocessor-based controller, such as controller 62, all or a part of which controller may function as the thermal management controller. Such controller and memory may be deployed in known mechanical power trowel systems that have electrically driven or hydraulically driven rotors, to equip such a system with thermal management of rotor speed according to the invention. Another embodiment of the invention may be realized as a mechanical power trowel system equipped with such a thermal management controller or thermal management control subsystem. The principles of the invention may also be embodied as a series of procedural steps for operating a power trowel, as a method according to the invention.

In other embodiments of the invention, a trowel system parameter other than rotor speed, or in addition to rotor speed, may be employed as a control variable. For example, a thermal management control scheme according to any of the foregoing embodiments may adjust a cooling fan speed, or a cooling pump speed, in response to sensing a temperature higher than a predetermined setpoint. Such an adjustment may be made to any control variable that is capable of reducing the sensed temperature, whether by forced cooling of overheated components, or by shedding load that contributes to overheating.

In one embodiment, the control variables are turned on in a hierarchical succession. In one implementation of this embodiment, the first control variable to be adjusted is rotor speed, the second variable to be adjusted is cooling pump speed, and the third variable to be adjusted is cooling fan speed. A succession such as this may be most advantageous for power trowels that rely on battery power for continued operation, when it becomes necessary to cool the trowel further beyond the capability provided by reducing rotor rpm. At this point when no further reduction of rotor rpm is possible without rendering the machine unusable, e.g., the rpm has been reduced to a lower operational limit such as 60 rpm, cooling pump or cooling fan may be turned on or accelerated to assist with cooling. An increase in cooling fan speed, however, can place a higher demand on battery power, therefore turning on power to the cooling fan should be avoided until other options for cooling the trowel have been employed that impose lower or no electrical demand.

In another embodiment of the invention, a controller is configured to alert the trowel operator of certain events associated with high temperatures conditions sensed within the power trowel system and with the thermal management mode of operation. The controller may alert the operator by means of one or more audible and/or visual alarms. A visual alarm may be as simple as the illumination of a labeled LED to indicate that the power trowel has entered thermal management mode, or to indicate a high temperature condition in one of the trowel system components. A visual alarm may also be provided as a diagnostic display message on a graphical user interface. For example, if operating temperature of a monitored component reaches or exceeds a temperature setpoint that triggers entry into thermal management mode, the controller upon receiving the high temperature signal causes (i.e. by executing a software routine stored in memory) the graphical user interface to display a visual warning to notify the operator that the power trowel has entered thermal management mode. In one example, the visual warning may include bright red, orange, or yellow coloring along with a warning symbol and/or language such as "Warning—THERMAL MANAGEMENT" or "SYSTEM RUNNING WARM, MAX ROTOR SPEED WILL BE REDUCED". In another example, the visual warning may identify the component of the trowel system that is overheating, e.g., "Warning—Heat Exchanger Outlet Hydraulic Temperature" or "Short Circuit—resistance is below 260 ohms" or "Short Circuit—temperature is above 175° F.". In one implementation, the foregoing warnings may be displayed as a conspicuous pop-up window in the foreground of the display screen, to obscure or partially obscure a normal appearance of the display. In this case, the operator may have an option to clear the warning after it has been displayed. In another implementation, in lieu of the pop-up window, or after the pop-up window has been cleared, a persistent visual warning may be displayed to alert and remind the operator that the power trowel is being operated in thermal management mode. One example of a persistent visual warning is the display of a bright red "THERM MGMT" message, static or blinking, superimposed onto the otherwise normal appearance of the display. Once the power trowel system has cooled sufficiently and blade speed control has been restored to normal operating mode, the persistent visual warning will shut off.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method of operating a power trowel, comprising:
    periodically reading, by a controller, at least one value representing temperature of a component of the power trowel;
    comparing, by the controller, the at least one value each time it is read to a predetermined lower limit and to a predetermined higher limit;
    sending, by the controller, a low-level decrease speed command to reduce rotor speed by a first incremental amount only whenever the at least one value meets or exceeds the lower limit and is less than the higher limit;

sending, by the controller, a high-level decrease speed command to reduce rotor speed by a second incremental amount that is greater than the first incremental amount only whenever the at least one value meets or exceeds the higher limit;

calculating, by the controller, a cumulative sum of all first incremental amounts and second incremental amounts sent by the controller; and reducing maximum rotor speed achievable by manual control according to the cumulative sum.

2. The method of claim 1 further comprising the controller limiting the cumulative sum to a predetermined bound.

3. The method of claim 1 wherein the controller sends the high-level decrease speed command at a higher frequency than a frequency at which the controller sends the low-level decrease speed command.

4. The method of claim 1 further comprising sending, by the controller, an increase speed command to increase rotor speed by a third incremental amount only whenever the at least one value is less than the lower limit.

5. The method of claim 4 wherein the third incremental amount is equal to one of the first incremental amount and the second incremental amount.

6. The method of claim 4 wherein the calculating step further comprises subtracting all occurrences of the third incremental amounts from the cumulative sum.

7. The method of claim 6 wherein the controller sends an increase speed command to increase rotor speed by a third incremental amount only whenever the at least one value is less than the lower limit and the cumulative sum is greater than zero.

8. The method of claim 1 wherein the controller executes steps of the method by reading instructions stored in a tangible computer readable memory.

9. The method of claim 8 wherein the predetermined lower limit comprises data that is stored in the memory and readable by the controller.

10. The method of claim 8 wherein the predetermined higher limit comprises data that is stored in the memory and readable by the controller.

11. The method of claim 8 wherein the first incremental amount comprises data that is stored in the memory and readable by the controller.

12. The method of claim 8 wherein the second incremental amount comprises data that is stored in the memory and readable by the controller.

13. The method of claim 8 further comprising the controller storing the cumulative sum in the memory.

14. A method of operating a power trowel, comprising:

periodically reading, by a controller, N values each representing a temperature of a different one of N components of the power trowel;

for each of the N values, updating, by the controller, each of a corresponding N adjusted speed commands by
   comparing the Nth value each time it is read to a predetermined lower limit;
   incrementing the Nth adjusted speed command by a first incremental amount whenever the Nth value meets or exceeds the lower limit; and
   storing the Nth adjusted speed command as incremented;

periodically selecting, by the controller, from among all N adjusted speed commands the Nth adjusted speed command that represents a greatest reduction in rotor speed; and reducing, by the controller, maximum rotor speed achievable by manual control according to the selected Nth adjusted speed command.

15. The method of claim 14 wherein at least one of the N values represents the temperature of a power trowel component selected from the group consisting of engine coolant, hydraulic fluid, and motor casing.

16. The method of claim 14 wherein the predetermined lower limit varies according to power trowel component.

17. The method of claim 14 wherein
the comparing step further comprises comparing the Nth value each time it is read to a predetermined higher limit; and wherein
the incrementing step further comprises incrementing the Nth adjusted speed command by a either a first incremental amount whenever the Nth value is less than the higher limit and meets or exceeds the lower limit, or by a second incremental amount whenever the Nth value meets or exceeds the higher limit.

18. The method of claim 17 wherein the second incremental amount is equal to the first incremental amount.

19. The method of claim 14 wherein
the incrementing step further comprises either incrementing the Nth adjusted speed command by a first incremental amount whenever the Nth value meets or exceeds the lower limit, or decrementing the Nth adjusted speed command by a decremental amount whenever the Nth value is less than the lower limit.

20. The method of claim 14, wherein the controller executes steps of the method by reading instructions stored in a tangible computer readable memory.

* * * * *